US012175790B2

(12) United States Patent
Sammoura et al.

(10) Patent No.: US 12,175,790 B2
(45) Date of Patent: Dec. 24, 2024

(54) ADAPTIVE FINGERPRINT-ENROLLMENT TO FINGER CHARACTERISTICS USING LOCAL UNDER-DISPLAY FINGERPRINT SENSOR IN AN ELECTRONIC DEVICE

(71) Applicant: Google LLC, Mountain View, CA (US)

(72) Inventors: Firas Sammoura, Dublin, CA (US); James Brooks Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/556,256

(22) PCT Filed: Apr. 23, 2021

(86) PCT No.: PCT/US2021/028966
§ 371 (c)(1),
(2) Date: Oct. 19, 2023

(87) PCT Pub. No.: WO2022/225534
PCT Pub. Date: Oct. 27, 2022

(65) Prior Publication Data
US 2024/0193985 A1 Jun. 13, 2024

(51) Int. Cl.
*G06V 40/13* (2022.01)
*G06V 40/12* (2022.01)
(52) U.S. Cl.
CPC ...... *G06V 40/1318* (2022.01); *G06V 40/1335* (2022.01)
(58) Field of Classification Search
CPC . G06V 40/50; G06V 40/1365; G06V 40/1318
See application file for complete search history.

(56) References Cited

U.S. PATENT DOCUMENTS

2014/0105470 A1\* 4/2014 Kraemer ............... G06V 40/13
382/124
2016/0063298 A1   3/2016 Tuneld et al.
(Continued)

FOREIGN PATENT DOCUMENTS

KR    101939097    7/2013
WO    2022225534   10/2022

OTHER PUBLICATIONS

"How to Set Up the Fingerprint Scanner", Accessed online at: https://www.samsung.com/au/support/mobile-devices/how-to-set-up-fingerprint-lock/ on Dec. 15, 2020, Dec. 15, 2020, 13 pages.
(Continued)

*Primary Examiner* — Yuzhen Shen
(74) *Attorney, Agent, or Firm* — Colby Nipper PLLC

(57) ABSTRACT

This document describes methods and systems of adaptive fingerprint-enrollment to finger characteristics using local under-display fingerprint sensors, UDFPS, in an electronic device. The electronic device includes an adaptive-enrollment module that determines characteristics of a fingerprint based on information corresponding to a touch input detected by a touch-display device, including size and shape of an area of the touch input. Based on the fingerprint characteristics, a number and location of enrollment touches used for completing enrollment of the fingerprint are adjusted to minimize the number of enrollment touches required to complete the enrollment, minimize the amount of time needed to complete the enrollment, and maximize coverage of the fingerprint. The adaptive-enrollment module also provides visual guidance to guide the user to touch the adjusted locations of the enrollment touches and, if needed, feedback to instruct the user to adjust the location of their finger to align with the visual guidance.

20 Claims, 12 Drawing Sheets

(56) References Cited

U.S. PATENT DOCUMENTS

| | | | | |
|---|---|---|---|---|
| 2016/0171281 A1* | 6/2016 | Park | ........................ | G06F 3/048 |
| | | | | 382/124 |
| 2016/0133602 A1 | 8/2016 | Dickinson et al. | | |
| 2017/0323142 A1 | 11/2017 | Chung et al. | | |
| 2018/0082102 A1* | 3/2018 | Lee | ........................ | G06V 40/67 |
| 2018/0129861 A1 | 5/2018 | Kim et al. | | |
| 2018/0137332 A1 | 5/2018 | Andersen et al. | | |
| 2019/0205515 A1* | 7/2019 | Lee | ........................ | G06F 21/32 |
| 2019/0362172 A1* | 11/2019 | Chien | .................... | G06V 40/50 |
| 2019/0370584 A1* | 12/2019 | Wang | .................... | G06F 3/0412 |
| 2024/0021022 A1* | 1/2024 | Park | ........................ | G06V 40/50 |

OTHER PUBLICATIONS

"International Search Report and Written Opinion", Application No. PCT/US2021/028966, Feb. 1, 2022, 12 pages.

"International Preliminary Report on Patentability", Application No. PCT/US2021/028966, Oct. 24, 2023, 9 pages.

* cited by examiner

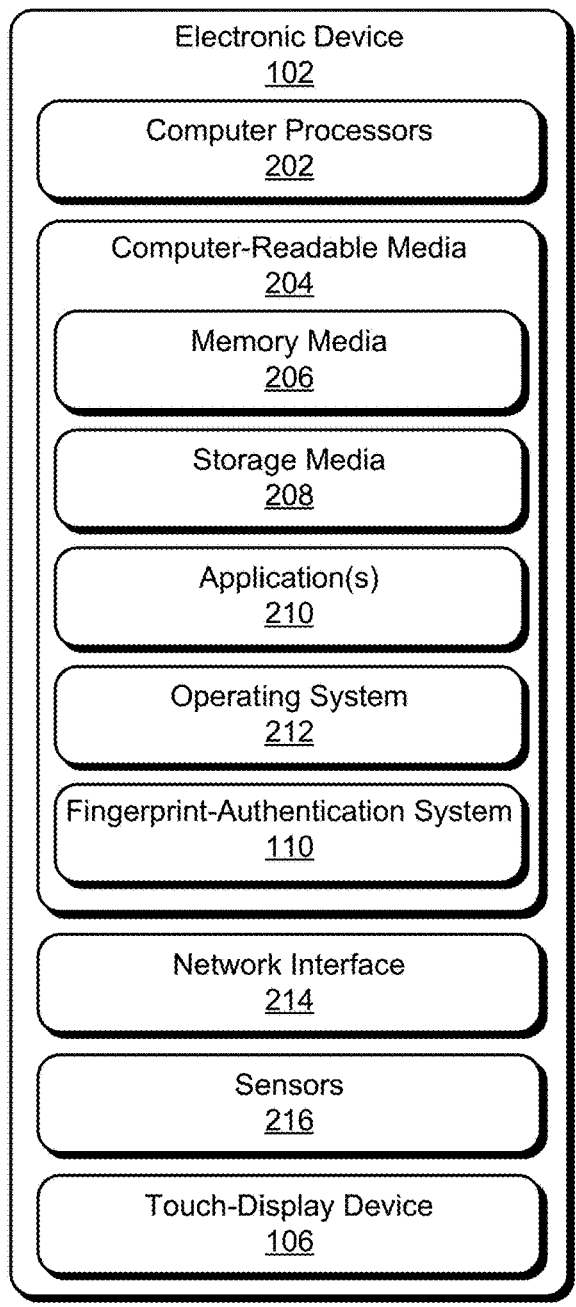
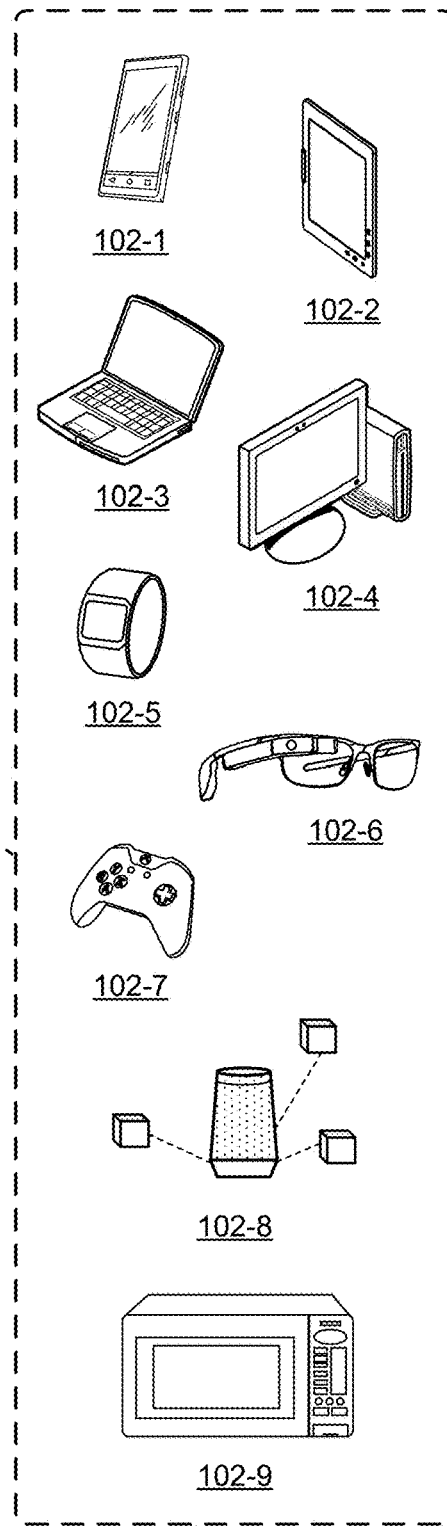
Fig. 2

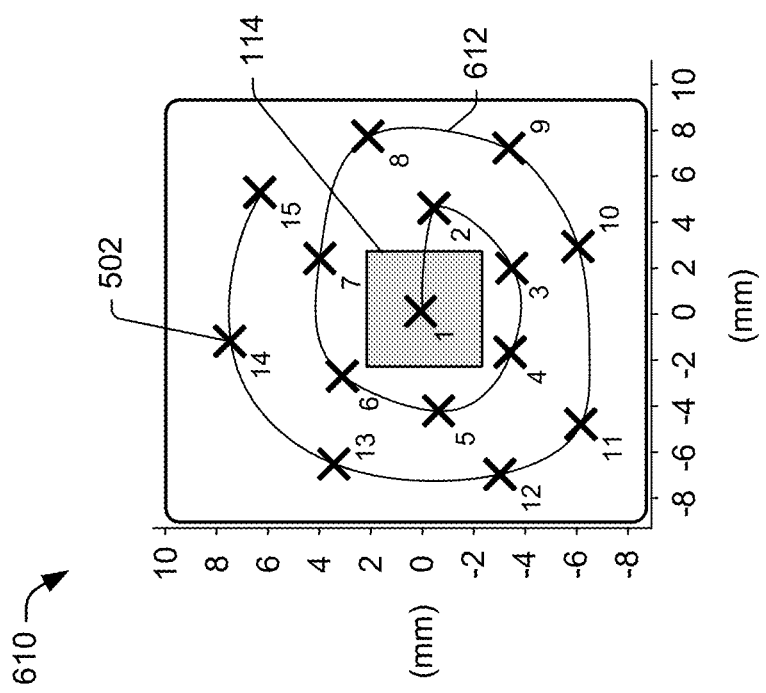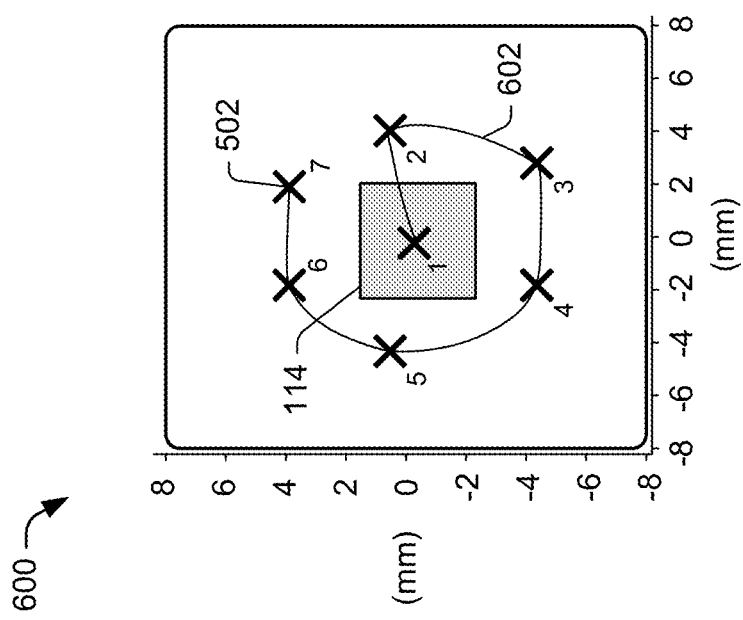
Fig. 6

ADAPTIVE FINGERPRINT-ENROLLMENT TO FINGER CHARACTERISTICS USING LOCAL UNDER-DISPLAY FINGERPRINT SENSOR IN AN ELECTRONIC DEVICE

RELATED APPLICATION(S)

This application is a national stage entry of International Application No. PCT/US2021/028966, filed Apr. 23, 2021, the disclosure of which is incorporated herein by reference in its entirety.

BACKGROUND

Fingerprint authentication systems are a useful way to authenticate a user to an electronic device. To reduce manufacturing costs, electronic devices may use local under-display fingerprint sensors (UDFPS), which are continuously being developed in decreased sizes. Due to their size, these smaller UDFPSs may be capable of capturing only a portion of the user's fingerprint. Because of this, multiple images of different parts of the fingerprint may be captured and stitched together to create a complete enrollment of the fingerprint. Existing fingerprint scanners generally have a uniform enrollment scheme with a fixed number of enrollment images. Because different users and different fingers have different fingerprint sizes, the enrollment experience may be different depending on the finger or the user. For example, large-size fingerprints may under-enroll (e.g., they may not have their fingerprint template fully covered and may have gaps between enrollment images) and/or small-size fingerprints may over-enroll (e.g., they may be required to provide more enrollments than necessary to fully cover their fingerprint template), thereby degrading and diminishing the user experience.

SUMMARY

This document describes methods and systems of adaptive fingerprint-enrollment to finger characteristics using local under-display fingerprint sensors in an electronic device. The electronic device includes an adaptive-enrollment module that determines characteristics of a fingerprint based on information corresponding to a touch input detected by a touch-display device, including size and shape of an area of the touch input. Based on the fingerprint characteristics, a number and location of enrollment touches used for completing enrollment of the fingerprint are adjusted to minimize the number of enrollment touches required to complete the enrollment, minimize the amount of time needed to complete the enrollment, and maximize coverage of the fingerprint. The adaptive-enrollment module also provides visual guidance to guide the user to touch the adjusted locations of the enrollment touches and, if needed, feedback to instruct the user to adjust the location of their finger to align with the visual guidance.

In some aspects, a method for adaptive fingerprint-enrollment to finger characteristics using local under-display fingerprint sensors in an electronic device is disclosed. The method includes providing a first visual guide via the touch-display device and at a location corresponding to an active area of a local under-display fingerprint sensor, the active area being smaller than a typical size of a fingerprint of a user. A first fingerprint image of a portion of the fingerprint of a user's finger touching the touch-display device at the location of the first visual guide is captured. A fingerprint contact region of the user's finger touching the touch-display device is determined, and based on the fingerprint contact region, one or more characteristics corresponding to the fingerprint are also determined. Based on the one or more characteristics of the fingerprint, a number of enrollment touches and target locations of the enrollment touches for enrolling the fingerprint in a fingerprint-enrollment system are adjusted. In addition, visual guidance is provided, based on the adjusted number and target locations of the enrollment touches, to indicate a sequence of locations on the touch-display device for the user to touch with the user's finger to complete enrollment of the fingerprint with the adjusted number of enrollment touches.

In other aspects, a mobile electronic device is disclosed. The mobile electronic device includes a touch-display device, a local under-display fingerprint sensor located under the touch-display device, one or more processors, and memory. The memory is configured to store instructions that, when executed by the one or more processors, cause the one or more processors to implement an adaptive-enrollment module to: provide an adaptive-enrollment scheme adapted to one or more characteristics of a fingerprint of a user during enrollment of the fingerprint; and provide visual guidance and feedback to guide the user through a sequence of target locations for placing their finger to provide enrollment touches. The visual guidance is output by the electronic device by performing the method described above.

In other aspects, computer-readable medium comprising instructions which, when executed by one or more processors, cause the one or more processors to carry out the method described above.

This summary is provided to introduce simplified concepts concerning adaptive fingerprint-enrollment to finger characteristics using local under-display fingerprint sensors in an electronic device, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of adaptive fingerprint-enrollment to finger characteristics using local under-display fingerprint sensors in an electronic device are described in this document with reference to the following drawings. The same numbers are used throughout the drawings to reference like features and components:

FIG. 2 illustrates an example implementation of the electronic device from FIG. 1 in more detail;

FIG. 6 illustrates examples of a sequence of visual-guidance locations adapted to fingerprint size during adaptive fingerprint-enrollment;

DETAILED DESCRIPTION

Overview

Figure 1:
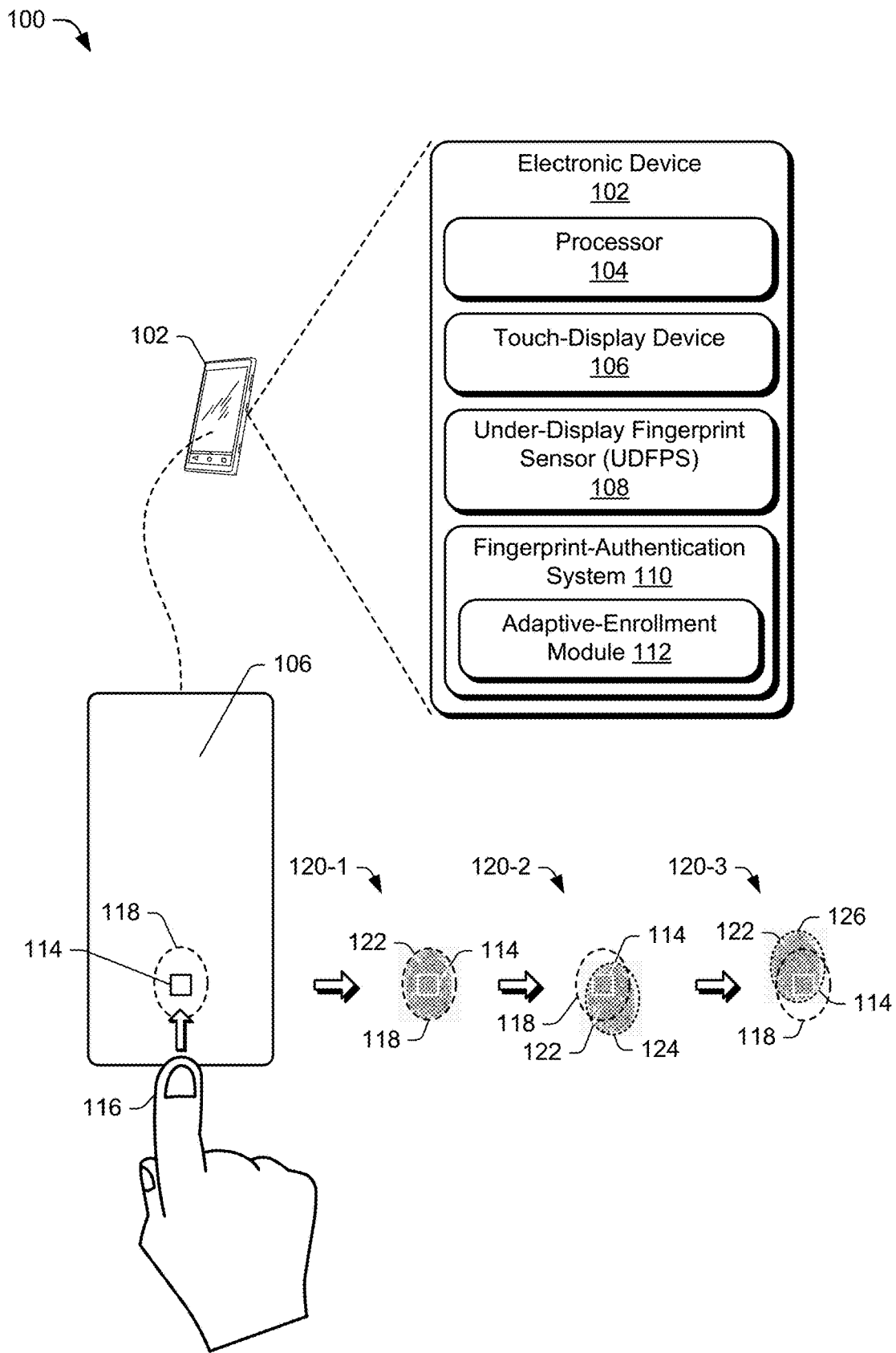
FIG. 1 illustrates an example implementation of an electronic device capable of implementing adaptive fingerprint-enrollment in accordance with the techniques described herein.

This document describes methods and systems for adaptive fingerprint-enrollment to fingerprint characteristics using a local under-display fingerprint sensor in an electronic device. The adaptive fingerprint-enrollment described herein leverages touch information obtained by the touch display, including an estimate of a contact area of the touch. The contact area of the touch has a general shape (e.g., an ellipse). The shape is used to determine major and minor axes, which may be used to approximate the size of a fingerprint of a finger providing the touch. In some aspects, the orientation of the touch (e.g., the ellipse) relative to the touch display can be determined based on the touch information detected by the touch display.

The enrollment is adapted to the characteristics of the particular finger in order to minimize the total number of enrollment templates required to complete the enrollment, reduce overlap between images captured during enrollment, increase the non-overlapping area for each new enrollment step, and maximize coverage of the enrolled fingerprint area in comparison to an ideal fingerprint. In addition, the electronic device may provide user-friendly visual guidance to indicate to the user where to place their finger for each enrollment touch. If the user follows the enrollment instructions, the enrollment process may be completed in a short period of time. In contrast, in some fingerprint systems that use an unguided enrollment process (e.g., request the user to touch the display in random locations), the user may repeat touch locations, which provides redundant enrollment data and, consequently, requires additional touches and additional time to complete the enrollment.

The electronic device may also provide accurate feedback to the user when the user does not follow the enrollment instructions. Such feedback may help optimize the enrollment process by reducing errors and decreasing the time consumed during enrollment. Accordingly, the visual guidance and feedback may be used to instruct the user how to enroll the ideal fingerprint area for each touch. The guidance is specific to how the user's finger lands on the touch display and, therefore, is personal to each user and to each finger.

The adaptive fingerprint-enrollment described herein may also increase user engagement because the visual guidance may be treated like a game. For example, the visual guidance provides a series of locations for the user to touch in sequence and the feedback may notify the user when their finger is not placed in the target location or within a threshold distance of the target location. These features may increase the user interaction in order to achieve the desired results.

While features and concepts of the described methods and systems for adaptive fingerprint-enrollment to finger characteristics using local under-display fingerprint sensors in an electronic device can be implemented in any number of different environments, aspects are described in the context of the following examples.

Example Device

FIG. 1 illustrates an example implementation 100 of an electronic device (e.g., electronic device 102) capable of implementing adaptive fingerprint-enrollment in accordance with the techniques described herein. The electronic device 102 is illustrated as including a processor 104, a touch-sensitive display (e.g., touch-display device 106), a local under-display fingerprint sensor 108 (UDFPS 108), and a fingerprint-authentication system 110 usable to provide a guided fingerprint-enrollment process that is adaptive to one or more characteristics (e.g., size, shape, orientation) of a fingerprint. In aspects, the fingerprint-authentication system 110 includes an adaptive-enrollment module 112 that, when executed by the processor 104, tailors an enrollment scheme to the characteristics of the user's fingerprint to reduce the total number of enrollment touches by the user that is required to complete enrollment of the user's fingerprint.

The local UDFPS 108 is embedded underneath the touch-display device 106, enabling the user to present their finger (e.g., finger, thumb, or palm) on the touch-display device 106 of the electronic device 102 for authentication. The local UDFPS 108 may be implemented as any suitable sensor, including a complementary metal-oxide-semiconductor (CMOS) image sensor, a capacitive image sensor, a charge-coupled device (CCD), an ultrasonic image sensor, a quanta image sensor (QIS), a thin-film transistor (TFT), an optical sensor, and so forth.

The fingerprint-authentication system 110 is configured to use the local UDFPS 108 to scan small images of different portions of a user's finger and stitch the images together to create a template of the fingerprint of the user's finger. The template is stored locally or remotely and is used to subsequently authenticate the user to the electronic device 102.

Due to its size, the local UDFPS 108 can only scan a small area (e.g., active area 114), which generally cannot capture the user's entire fingerprint in a single scan or image. For example, a typical size (e.g., average size) of a fingerprint is approximately 225 mm$^2$, whereas the active area 114 may be significantly smaller, e.g., 50% to 80% smaller. FIG. 1 illustrates a simple example in which the user touches the touch-display device 106 with a finger 116 at a first location 118 (designated by a dashed ellipse) corresponding to, and centered over, the active area 114 of the local UDFPS 108. As illustrated in instance 120-1, the user's fingerprint 122 is significantly larger than the active area 114 of the local UDFPS 108. When the user places their finger at the first location 118, the local UDFPS 108 scans a center portion of the fingerprint 122. Then, at instance 120-2, the user places their finger 116 at a different location (e.g., second location 124) that is not centered over the active area 114 of the local UDFPS 108. In this example, the second location 124 is offset from the center location (e.g., the first location 118). This second location 124 enables the local UDFPS 108 to scan another portion of the fingerprint 122. Then, at instance 120-3, the user places their finger 116 at yet another location (e.g., third location 126) to enable the local UDFPS 108 to scan an additional portion of the fingerprint 122. After scanning a sufficient number of different portions of the fingerprint 122, the fingerprint-authentication system 110 can stitch together the scans to create a template of the user's fingerprint for use in subsequent authentication attempts to the electronic device 102.

In more detail, consider FIG. 2, which illustrates an example implementation 200 of the electronic device 102 from FIG. 1. The electronic device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The electronic device 102 can also include other devices, e.g., televisions, entertainment systems, audio systems, automobiles, drones, track pads, drawing pads, netbooks, e-readers, home security systems, and other home appliances. Note that the electronic device 102 can be mobile, wearable, non-wearable but mobile, or relatively immobile (e.g., desktops and appliances).

The electronic device 102 also includes one or more computer processors 202 (e.g., processor 104) and one or more computer-readable media 204, which includes memory media 206 and storage media 208. Applications 210 and/or an operating system 212 implemented as computer-readable instructions on the computer-readable media 204 can be executed by the computer processors 202 to provide some or all of the functionalities described herein. For example, the computer-readable media 204 can include the fingerprint-authentication system 110, which is described in FIG. 3 in more detail. The fingerprint-authentication system 110 is configured to adapt the fingerprint-enrollment process to characteristics of a user's finger and provide visual guidance and feedback to assist the user in providing touches that optimize the fingerprint-enrollment process.

The electronic device 102 may also include a network interface 214. The electronic device 102 can use the network interface 214 for communicating data over wired, wireless, or optical networks. By way of example and not limitation, the network interface 214 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the fingerprint-authentication system 110 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The electronic device 102 also includes one or more sensors 216, which can include any of a variety of sensors, including an audio sensor (e.g., a microphone), a touch-input sensor (e.g., a touchscreen), an image-capture device (e.g., a camera or video-camera), proximity sensors (e.g., capacitive sensors), an ambient light sensor (e.g., photodetector), or the local UDFPS 108.

The electronic device 102 can also include a display device (e.g., the touch-display device 106). The touch-display device 106 can include any suitable touch-sensitive display device, e.g., a touchscreen, a liquid crystal display (LCD), thin film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth. The touch-display device 106 may be referred to as a display or a screen, such that content may be displayed on-screen.

Figure 3:
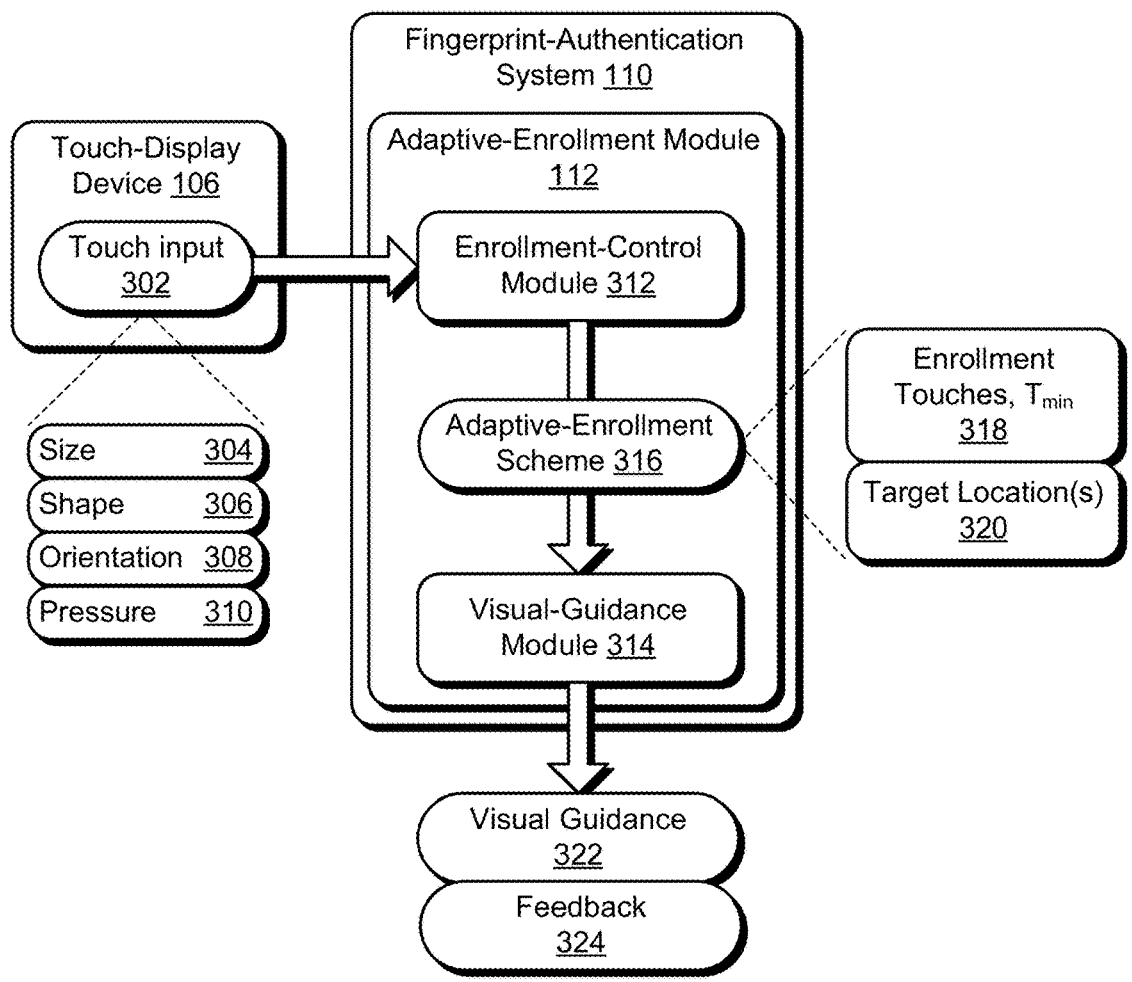
FIG. 3 illustrates an example implementation of the fingerprint-authentication system from FIG. 1 in more detail.

FIG. 3 illustrates an example implementation 300 of the fingerprint-authentication system 110 from FIG. 1 in more detail. Although FIG. 3 shows various entities and components as part of the fingerprint-authentication system 110, any of these entities and components may be separate from the fingerprint-authentication system 110 such that the fingerprint-authentication system 110 accesses and/or communicates with them to manage the adaptive fingerprint-enrollment on the electronic device 102.

In FIG. 3, the touch-display device 106 detects a touch event (e.g., touch input 302). The touch-display device 106 provides one or more characteristics of the touch input 302. At least one of the characteristics may represent a parameter of the fingerprint of the finger used to provide the touch input 302. In aspects, the characteristics may include one or more of size 304 and/or shape 306 of the contact area of the touch input 302. The size 304, for example, can be used to approximate a size or shape of the fingerprint. In some implementations, the characteristics may include an orientation 308 of the touch input 302, which may indicate a direction the user's finger is pointing relative to one or more axes (e.g., vertical axis, horizontal axis) of the touch-display device 106. The characteristics may also include an amount of pressure 310 of the touch input 302 on the touch-display device 106. Because the size of the contact area of the touch input 302 may vary with the flatness of the finger contacting the touch-display device 106, the pressure 310 may indicate how accurately the size of the contact area is representing the size of the fingerprint. The pressure 310 may be estimated from a heatmap of the touch input 302 and may be usable to determine whether to instruct the user to press more firmly to increase a coupling between the user's finger and the touch-display device 106 to thereby increase an image quality of the images of the fingerprint captured by the local UDFPS 108.

The touch-display device 106 provides the characteristics of the touch input 302 to the adaptive-enrollment module 112 of the fingerprint-authentication system 110. The adaptive-enrollment module 112 includes an enrollment-control module 312 and a visual-guidance module 314. The enrollment-control module 312 receives the information (e.g., at least the size 304) from the touch-display device 106 and uses the characteristics of the touch input 302 to create an adaptive-enrollment scheme 316 that is adapted to the particular finger providing the touch input 302. In aspects, the adaptive-enrollment scheme 316 defines a minimum number of required enrollment touches (e.g., $T_{min}$ 318) and corresponding target touch-locations 320 that optimize the enrollment process for the particular finger, based on the characteristics of the touch input 302. Further, the adaptive-enrollment scheme 316 is created to provide sufficient overlap (e.g., overlap substantially within a range of 0.1% to 2%) between consecutive images of the enrollment touches for stitching the images together, while also avoiding excess overlap that may create redundancies. The target touch-locations 320 are determined effective to increase (e.g., substantially maximize) a non-overlapping area of each new enrollment touch and reduce the number of enrollments required to achieve a total amount of coverage of the fingerprint that is within a threshold tolerance (e.g., 1%, 1.5%, 2.2%, 5%) of the approximated fingerprint size. Accordingly, the characteristics of the touch input 302, which represent a contact area of the finger on the touch-display device 106 (e.g., major axis, minor axis, tilt or rotation with respect to a vertical axis of the touch-display device 106), are used to optimize the coverage of the fingerprint.

The visual-guidance module 314 is configured to use the adaptive-enrollment scheme 316 to provide visual guidance 322 corresponding to the target touch-locations 320. The visual guidance 322 may be in a suitable form presented via the touch-display device 106 (from FIG. 1) to indicate where the user is to place their finger. The visual guidance 322 may act as a moving target that moves to a new location after the user successfully touches their finger to the touch-display device 106 at the target location (within an acceptable tolerance of misalignment). As described herein, the visual guidance 322 visually indicates a sequence of locations that follow a path (e.g., a spiral path) of incremental movements, which reduces overlap between consecutive fingerprint images while also increasing non-overlapping areas of each fingerprint image and maximizing coverage of the fingerprint.

The visual-guidance module 314 may also provide feedback 324 to the user when the placement of the finger is substantially misaligned (e.g., exceeds the acceptable tolerance) from the target touch-location 320. The feedback 324 can be provided in any suitable form to instruct the user and guide the user to align their finger with the visual guidance 322. In an example, the feedback 324 may include a message with text instructing the user to move their finger in a certain direction, press more firmly, etc. In another example, the feedback 324 may include a request for the user to press more firmly (e.g., apply more pressure) on the touch-display device 106, if the pressure 310 is below a pressure threshold, to cover more area of the fingerprint during enrollment or to enable the local UDFPS 108 to capture high-quality images of the fingerprint. Another example includes determining that the image quality of a captured image of a portion of the fingerprint is below a quality threshold and responsively estimating the pressure 310 of the touch input on the touch-display device 106 based on a heatmap of the touch input. If the pressure 310 is below the pressure threshold, the feedback 324 can be provided to the user to ask the user to increase the pressure 310 of the touch input, which may increase a coupling between the user's finger and the touch-display device to increase the image quality of the image captured by the local under-display fingerprint sensor. Further details are described below with respect to FIGS. 5 and 6. In some aspects, the visual guidance 322 can be adjusted dynamically throughout the enrollment process, based on one or more of the enrollment touches, to maximize the total area of the fingerprint to be enrolled.

These and other capabilities and configurations, as well as ways in which entities of FIGS. 1-3 act and interact, are set forth in greater detail below. These entities may be further divided, combined, and so on. The implementation 100 of FIG. 1 and the detailed illustrations of FIG. 2 through FIG. 12 illustrate some of many possible environments, devices, and methods capable of employing the described techniques.

Figure 4:
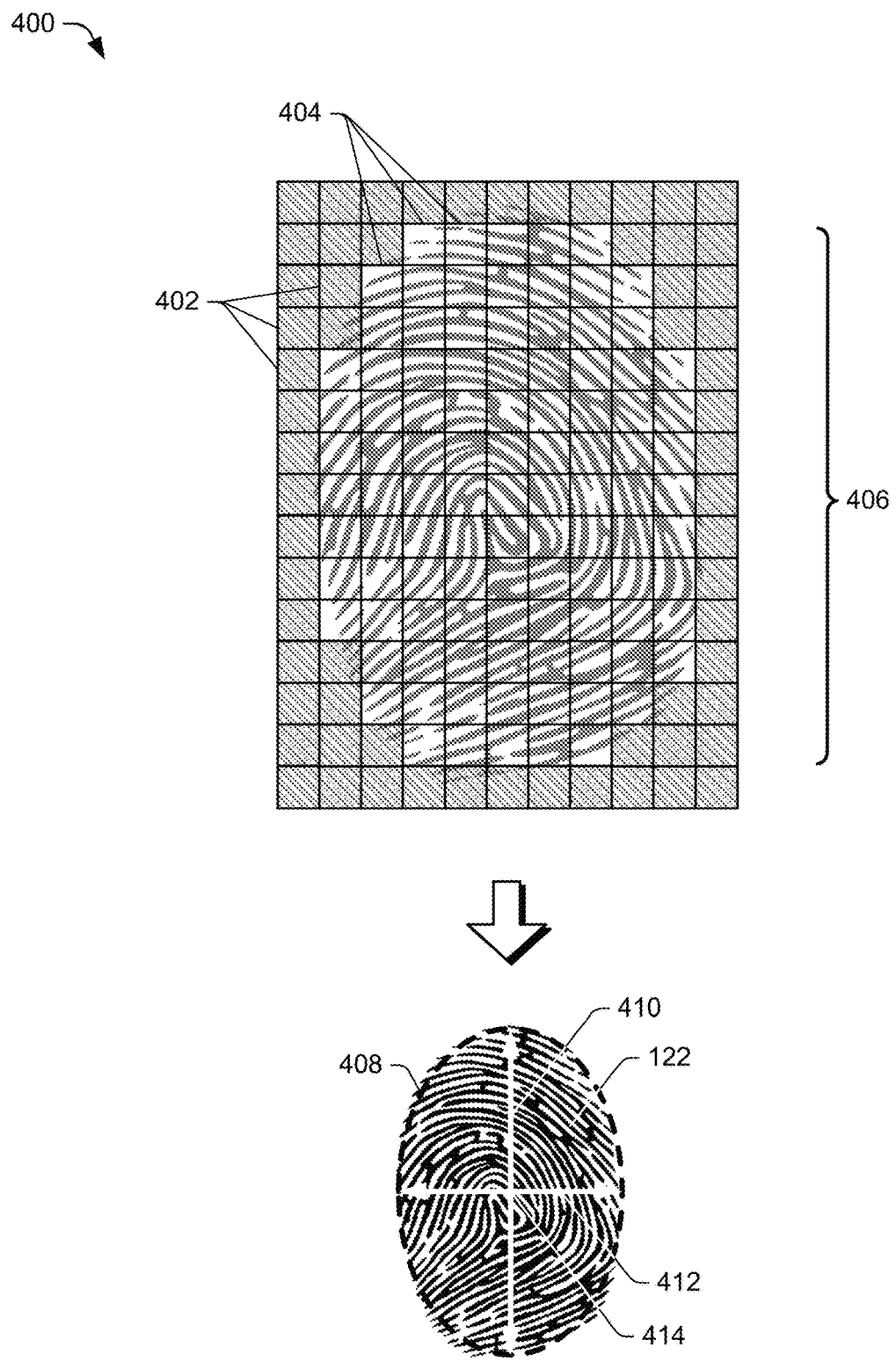
FIG. 4 illustrates an example implementation of a detection of fingerprint size corresponding to a touch input via the touch-display device of FIG. 1.

FIG. 4 illustrates an example implementation 400 of a detection of fingerprint size corresponding to a touch input via the touch-display device 106 of FIG. 1. The touch-display device 106 may be used to approximate the size of the user's fingerprint. For example, the touch-display device 106 may include a grid of sensors to enable complex input, such as an area of contact by a finger. In an example, the touch-display device 106 may determine a size of the contact area, which corresponds to an approximate size of a fingerprint of the finger.

The illustrated example shows a response of a portion of the touch-display device 106 based on a finger touch. For example, shaded squares 402 (e.g., pixels) represent no finger presence and non-shaded squares 404 (e.g., pixels) represent a presence of a finger. The pixels indicating the presence of the finger can be aggregated to provide a contact area of the finger. The contact area is usable to generate a heatmap 406. Existing touch displays can generate the heatmap 406 of the contact area of a touch input. In implementations, the heatmap 406 may act as a representation of how much each pixel has coverage of the finger as it relates to the amount of capacitance detected in the touch-display device 106 at that pixel location. Using the heatmap 406, the fingerprint-authentication system 110 can estimate one or more characteristics of the fingerprint 122 of the finger, including a size and/or shape of the fingerprint 122. Any suitable two-dimensional shape can be used to approximate the shape of the fingerprint 122, including an elliptical shape, a rectangular shape, a square shape, a trapezoidal shape, and so forth. In the illustrated example, the fingerprint 122 shape is approximated as an ellipse (e.g., ellipse 408) having a major axis 410 and a minor axis 412. By estimating the shape, based on the heatmap 406, the major axis 410 and the minor axis 412 can be calculated to approximate the size of the fingerprint 122. Additionally, a centroid 414 of the fingerprint can be determined, which can be used in determining the target touch-locations 320 of the enrollment touches. The size of the fingerprint 122 is used to adjust the adaptive-enrollment scheme 316.

Figure 5:
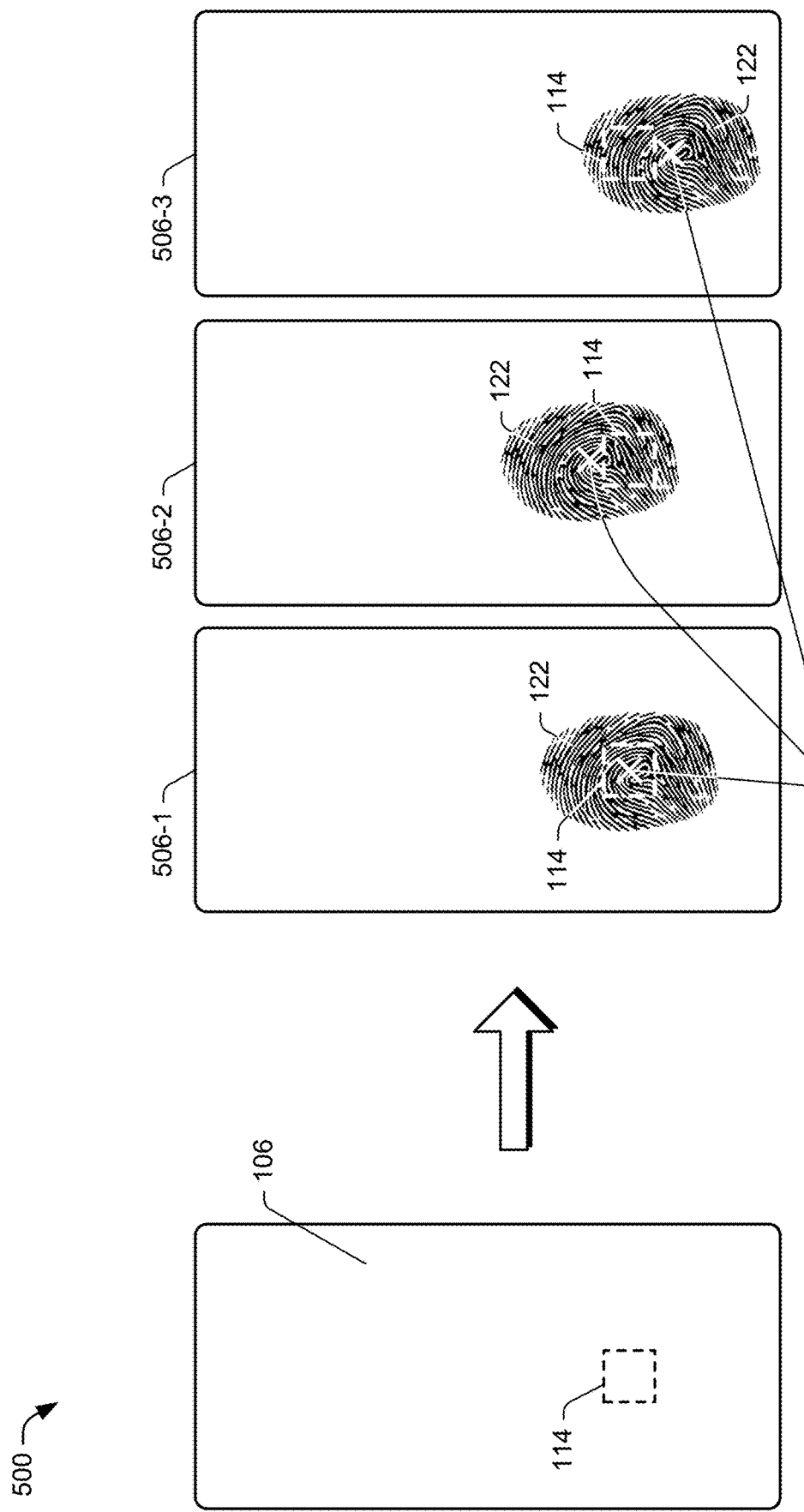
FIG. 5 illustrates an example implementation of visual guidance provided during adaptive fingerprint-enrollment.

FIG. 5 illustrates an example implementation 500 of visual guidance (e.g., the visual guidance 322 from FIG. 3) provided during adaptive fingerprint-enrollment. Based on the adaptive-enrollment scheme 316, the fingerprint-authentication system 110 can provide visual guidance (e.g., visual guide 502, shown as an "X" for illustrative purposes) as to specific locations for the user to place their finger. Using the visual guide 502, the user places their finger such that a centroid of their finger touches the visual guide 502 or a location proximate to the visual guide 502. Alternatively, the visual guide 502 may be an ellipse that the user touches, such that the contact area of the finger substantially fills the ellipse. Any suitable visual artifact (e.g., icon, shape, object) may be implemented as visual guidance to indicate to the user where to touch the touch-display device 106. By touching the touch-display device 106 at different locations based on the visual guide 502, different parts of the fingerprint 122 are enrolled.

For example, the touch-display device 106 is shown with the active area 114 of the local UDFPS 108. Instances 506-1, 506-2, and 506-3 illustrate different enrollments based on different touch locations on the touch-display device 106. Instance 506-1 represents a first enrollment in which the fingerprint 122 is centered over the active area 114 of the local UDFPS 108. In this way, when the electronic device 102 provides guidance to the center of the active area 114 of the local UDFPS 108, the user enrolls the center of their fingerprint 122. For example, the visual guide 502 (illustrated as an "X") may be positioned based on the centroid of the fingerprint 122, which is calculated based on the size and shape of the fingerprint 122. When the visual guide 502 is located above the active area 114 of the local UDFPS 108, as shown in instance 506-2, the user enrolls a lower part of their fingerprint 122. When the visual guide 502 is located below the active area 114, as shown in instance 506-3, the user enrolls an upper part of their fingerprint 122. Accordingly, by moving the location of the visual guide 502, different parts of the fingerprint 122 are enrolled, assuming the user successfully follows the guidance with the centroid of their fingerprint (e.g., middle of their finger).

The visual guides 502 can be adapted to the characteristics (e.g., size, shape, orientation) of the fingerprint. For example, for a larger fingerprint size, the visual guide 502 can be increased in size to enable the user to more easily track, or align their finger with, the visual guide 502. Further, the visual guide 502 may be provided relative to finger landing (e.g., touch location), the local UDFPS 108, and the touch-display device 106. Consequently, the visual guide 502 may be dynamic because it may depend on the fingerprint size, the tilt (e.g., the orientation 308) of the fingerprint with respect to the touch-display device 106, and the position relative to the local UDFPS 108 and the touch-display device 106. Further, the visual guide 502 may be rotated and/or translated if the contact area of the touch input is rotated relative to the vertical axis of the touch-display device 106. For example, if the user rotates their finger from one enrollment touch to the next, the adaptive-enrollment scheme 316 and, consequently, the visual guides 502 can be adapted to the new orientation of the fingerprint.

Existing fingerprint-enrollment systems may use an unguided-enrollment scheme, which asks the user to continue touching the display until the device indicates that the enrollment is complete. Accordingly, the user touches the display in random locations, sometimes returning to the same or similar location, resulting in redundant enrollments, which in turn results in an increased number of touches and an increased amount of time to complete the enrollment. Using random locations of enrollment touches may capture areas of the finger having little value with respect to the fingerprint (e.g., outer edges of the fingerprint) and/or may result in gaps between non-overlapping scans. At least some of these issues may be addressed and minimized using adaptive fingerprint-enrollment techniques described in FIG. 6 in more detail.

FIG. 6 illustrates examples 600 and 610 of a sequence of visual-guidance locations adapted to fingerprint size during adaptive fingerprint-enrollment. The examples 600 and 610 illustrate a comparison between an adaptive-enrollment scheme provided for a smaller fingerprint (e.g., approximately 256 square millimeters ($mm^2$)) and a larger fingerprint (e.g., approximately 361 $mm^2$). For instance, the example 600 uses fewer enrollment touches for the smaller fingerprint, while the example 610 uses more enrollment touches for the larger fingerprint. The visual guides 502 indicate target locations (e.g., the target touch-locations 320 from FIG. 3) for each sequential enrollment touch. In operation, the visual guides 502 are displayed one at a time to indicate a specific location for the user to place their finger to enable the electronic device 102 to scan a specific portion of the user's fingerprint over the active area 114 of the local UDFPS 108 (from FIG. 1). In this example, the visual guide 502 represents the location where the user is to place the centroid (e.g., the centroid 414 from FIG. 4) of their finger. In the example 600, the adaptive-enrollment scheme can use seven enrollment touches to complete the enrollment process with sufficient coverage of the smaller fingerprint. In contrast, the example 610 illustrates uses 15 enrollment touches to obtain sufficient coverage of the larger fingerprint for completing the enrollment process.

In addition, notice that the visual guides 502 are ordered to sequentially form a spiral pattern (e.g., spiral pattern 602, spiral pattern 612). The sequence of locations used by the visual guides 502 can form any suitable pattern or shape, including an elliptical shape, a rectangular shape, a star shape, a trapezoidal shape, a triangular shape, and so forth.

In the illustrated examples, a spiral pattern is used, which enables small increments of movement by the user's finger between enrollment touches (e.g., moving from one target position to an adjacent target position). These small increments may enable more-accurate positioning of the fingerprint, with an appropriate level of overlap between consecutive scans. Further, user engagement is enhanced because of the moving target (e.g., the visual guide 502) that the user follows with their finger to fulfill the visual guidance, similar to playing a game.

In some aspects, the pattern formed by the sequence of visual guides 502 may be a predefined pattern of target touch points. In this way, the visual guidance may be universal for an average finger size. In other aspects, the pattern may be an algorithmically defined pattern of target touch points. The algorithmically defined pattern may be adaptive to a specific finger based on the identified characteristics of that finger. The locations (e.g., target touch-locations 320) of the visual guides 502 can be determined based on the initial calculations of the characteristics of the first enrollment touch (e.g., the touch input 302 from FIG. 3). However, if subsequent enrollments have a new orientation that substantially differs from the orientation of the first enrollment touch, then the visual guides 502 can be readapted to align with the new orientation.

In addition, the visual guidance may be dynamically adjusted during enrollment. For example, at any time after the first enrollment touch, the adaptive-enrollment module 112 can adjust the adaptive-enrollment scheme 316 (from FIG. 3) by, for example, adding additional enrollment touches and/or adjusting the location (e.g., the target touch-locations 320) of the enrollment touches to dynamically optimize the coverage of the fingerprint.

Figure 7:
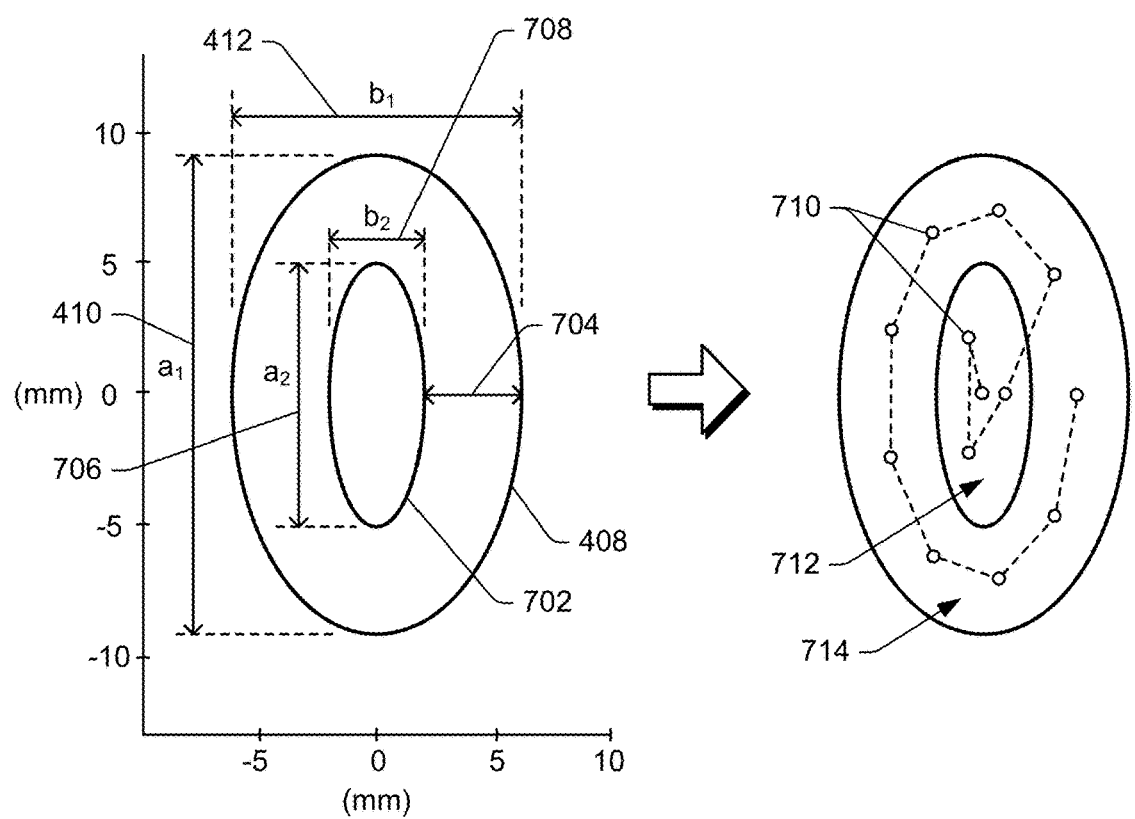
FIG. 7 illustrates an example plot corresponding to details of an algorithm used to determine fingerprint size, number of enrollment touches, and locations of the enrollment touches.

FIG. 7 illustrates an example plot 700 corresponding to details of an algorithm used to determine fingerprint size, number of enrollment touches, and locations of the enrollment touches for the adaptive fingerprint-enrollment. In the illustrated example, a first ellipse (e.g., the ellipse 408 approximated for the fingerprint 122 based on the heatmap 406 from FIG. 4) is determined. Based on characteristics of the first ellipse, one or more additional, smaller ellipses (e.g., new ellipse 702) are calculated and used to determine the number and target locations of the enrollment touches for the adaptive fingerprint-enrollment.

In the illustrated example, the adaptive-enrollment module 112 determines major and minor ellipse-dimensions, $a_1$ and $b_1$, respectively, of the contact area of a touch input. The major ellipse-dimension, $a_1$, may correspond to the major axis 410 of the ellipse 408 approximated for the fingerprint 122 based on the heatmap 406 (from FIG. 4) of the touch input. The minor ellipse-dimension, $b_1$, may correspond to the minor axis 412 of the ellipse 408 approximated for the fingerprint 122 based on the heatmap 406 of the touch input. The ellipse 408 (also referred to as a "fingerprint ellipse") may be dissected into smaller ellipses. For example, the adaptive-enrollment module 112 may construct the new ellipse 702, which has an offset 704 from the fingerprint ellipse (e.g., the ellipse 408). In aspects, the offset 704 may have some correlation to the size of the active area 114 of the local UDFPS 108 (from FIG. 1). The new ellipse 702 includes a major ellipse-dimension 706, $a_2$, and a minor ellipse-dimension 708, $b_2$. Based on the fingerprint size (e.g., represented by the ellipse 408), the adaptive-enrollment module 112 may infer locations (e.g., locations 710) that provide sufficient overlap (e.g., at least a threshold overlap) between consecutive images (e.g., scans) of the fingerprint and sufficient total coverage (e.g., within a threshold tolerance, as described with respect to FIG. 3) of the fingerprint for enrollment. The locations 710 may be determined based on a correlation between the size of the active area 114 of the local UDFPS 108 in FIG. 1 and regions (e.g., region 712 and region 714) of the ellipses. In an example, the region of the ellipse 408 is the difference between the area of the ellipse 408 and the area of the ellipse 702. Further, the locations 710 may be presented to the user in an ordered sequence that follows a defined pattern (e.g., a spiral pattern), as described with respect to FIG. 6. More detail of this process is described in FIG. 8, which refers to features described in FIG. 7.

Figure 8:
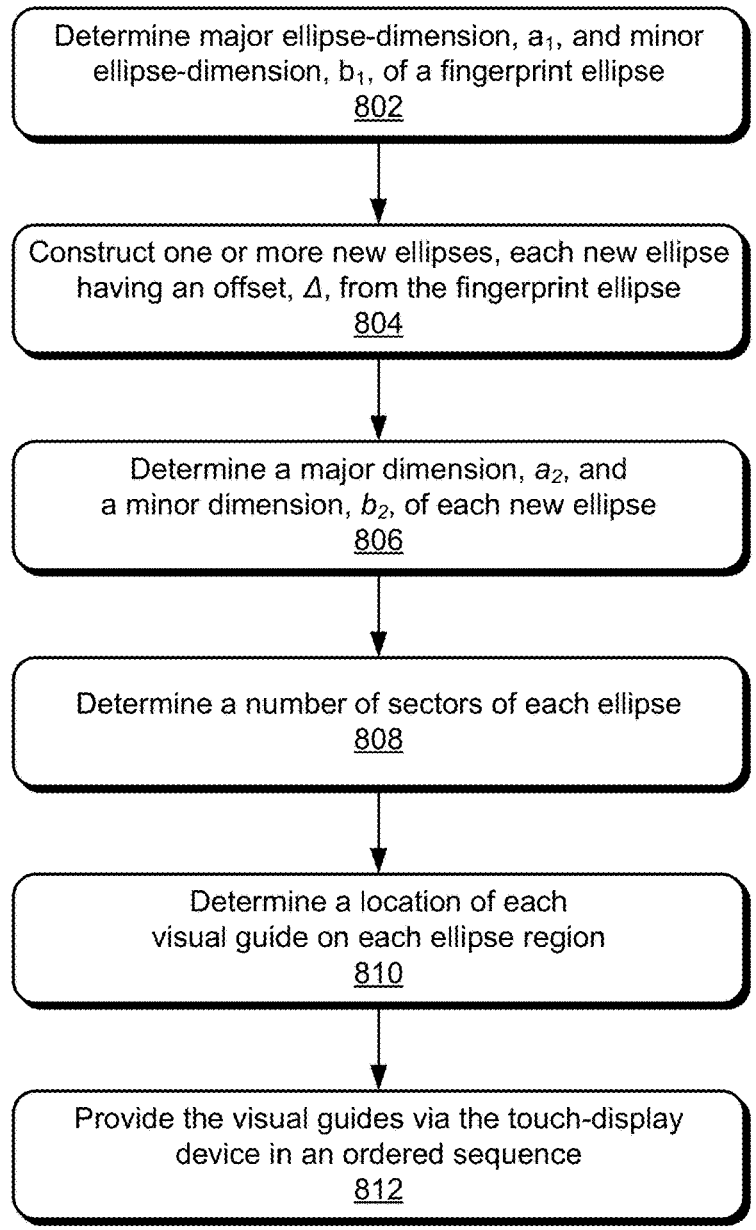
FIG. 8 depicts an example method for determining a number and locations of visual guides for the adaptive fingerprint-enrollment.

FIG. 8 depicts an example method for determining a number and locations of visual guides for the adaptive fingerprint-enrollment. At 802, a major ellipse-dimension, $a_1$, and a minor ellipse-dimension, $b_1$, are determined. As an example, the major axis 410 and the minor axis 412 are determined for the ellipse 408 that is approximated based on the heatmap 406 of the touch input. At 804, the adaptive-enrollment module 112 constructs one or more new ellipses, where each new ellipse has an offset, $\Delta$, (e.g., the offset 704) from the ellipse 408. Each new ellipse is also concentric with the ellipse 408. The offset 704 may be different for each new ellipse. In some aspects, the offset 704 increases for each new ellipse, causing each new ellipse to be smaller than the previous one.

At 806, a major ellipse-dimension, $a_2$, and a minor ellipse-dimension, $b_2$, are determined for each new ellipse. For example, the major ellipse-dimension 706, $a_2$, and the minor ellipse-dimension 708, $b_2$, of the new ellipse 702 are determined. To ensure the new ellipse 702 is usable for the algorithm, limits may be applied to the new ellipse. For example, if either the major ellipse-dimension, $a_2$, or the minor ellipse-dimension, $b_2$, for any given new ellipse is below zero, then that new ellipse is not recorded and not used in subsequent steps of the method 800. However, if $a_2$ and $b_2$ of a given new ellipse are both greater than zero and at least one of $a_2$ or $b_2$ is below a threshold, H, then the given new ellipse is recorded and used in subsequent steps of the method 800. If both $a_2$ and $b_2$ are greater than the threshold, H, then the method 800 may return to 804 to construct another new ellipse with a different offset.

At 808, a number of sectors of each ellipse is determined. For example, an area of each ellipse region (e.g., region 712 or region 714 in FIG. 7) is determined. Then, each area is divided by the square of the corresponding offset (e.g., $\Delta^2$), and the result is rounded to the higher integer number that represents the number of sectors for that ellipse. In aspects, a minimum number of sectors may be three (e.g., if the number of sectors is less than three, then the number of sectors is set to three). If the number of sectors for a given ellipse is greater than the minimum number, then that greater number is set as the number of sectors for the given ellipse.

At 810, the location of each visual guide 502 is determined for each ellipse region. In aspects, a first point is located at point (0, 0), which is centered on the active area 114 of the local UDFPS 108 (as illustrated in the examples 600 and 610 shown in FIG. 6). At least some of the locations 710 are positioned on the ellipse region median. In addition, the locations 710 include points located on the specific number of sectors dividing each ellipse region. Further, the locations 710 are ordered from the center, small ellipses to the larger ellipses. This order enables the user to provide small, incremental movements of their finger between consecutive enrollment touches, which may increase the accuracy of the enrollments.

At 812, the visual guides are provided via the touch-display device in an ordered sequence. For example, the visual guides 502 are displayed, one at a time, according to the locations 710 and in a pattern (e.g., a predefined pattern or an algorithmically-defined pattern). The pattern may be a spiral pattern beginning at the center of the active area 114 of the local UDFPS 108. The display of the visual guides 502 follows the ordered sequence based on touch input. For example, if a touch input corresponding to a first visual guide is accepted, the first visual guide is removed and a second visual guide in the ordered sequence is displayed. Further details of these features are described below.

Figure 9:
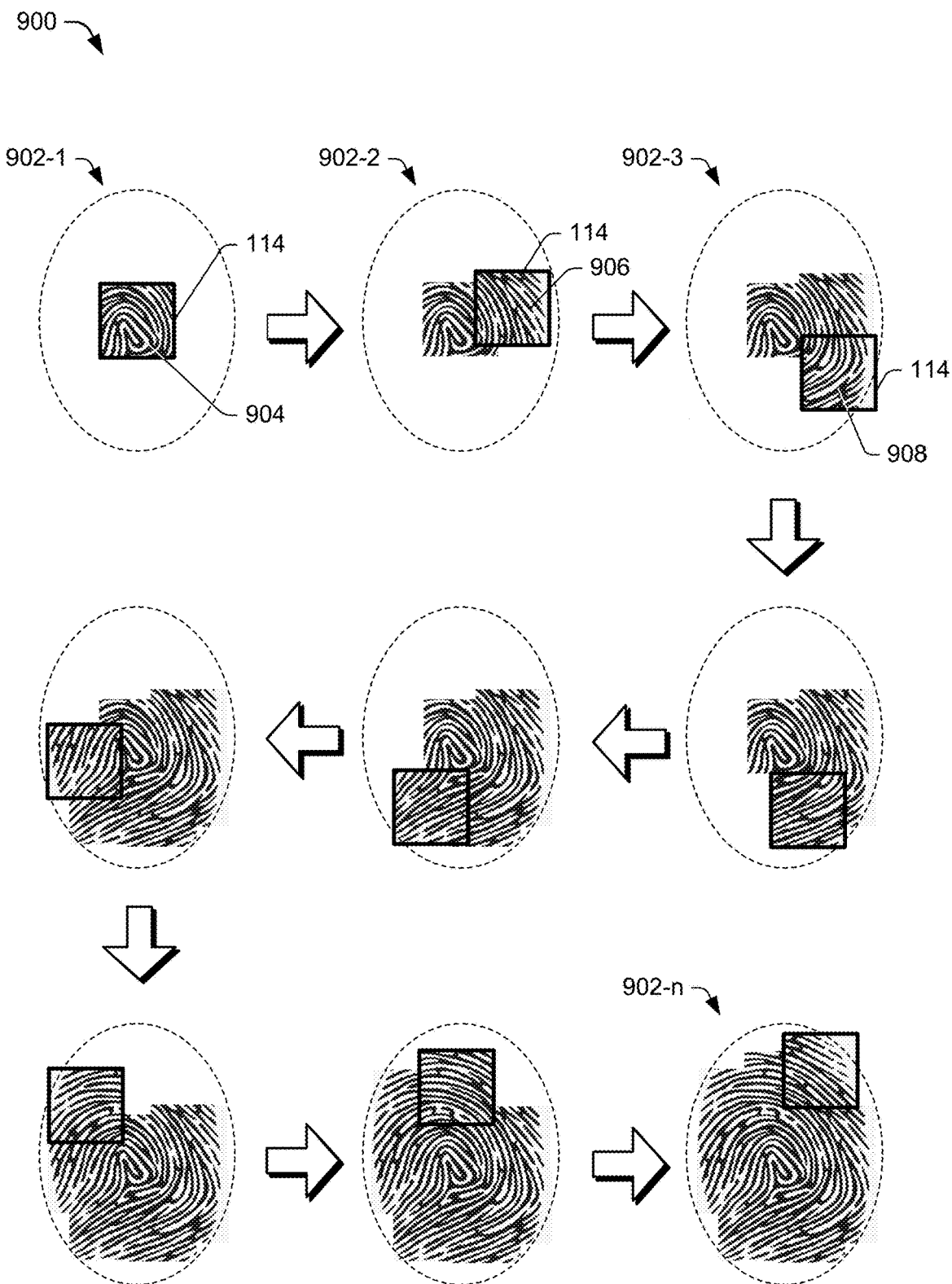
FIG. 9 illustrates an example sequence of captured images being stitched together during adaptive fingerprint-enrollment in accordance with the techniques described herein.

FIG. 9 illustrates an example sequence 900 of captured images being stitched together during adaptive fingerprint-enrollment in accordance with the techniques described herein. For example, as the user provides enrollment touches according to the guided-enrollment scheme and the instructions provided by the visual guidance (e.g., the visual guides 502 from FIG. 5) described herein, the local UDFPS 108 scans portions of the fingerprint and stitches the scans together to complete enrollment of the fingerprint. In instance 902-1, the user provides a first touch such that the centroid of the finger is located over the active area 114 of the local UDFPS 108, and the local UDFPS 108 scans the finger to obtain a first portion 904 (e.g., center portion) of the fingerprint. In instance 902-2, the user provides a second touch having the centroid of the finger positioned at a location that is offset (e.g., to the left) from the center of the active area 114, and the local UDFPS 108 scans a second portion 906 of the fingerprint. In instance 902-3, the user provides a third touch such that the centroid of the finger is located at yet another location offset (e.g., upper left) from the center of the active area 114, and the local UDFPS 108 scans a third portion 908 of the fingerprint. Each new enrollment has minimal overlap with the previous enrollment, without a gap between consecutive images, which reduces the total number of enrollments needed to complete the enrollment of the fingerprint with sufficient coverage. In this example, each new scanned portion follows a spiral pattern. However, any suitable pattern can be followed. The user continues to provide enrollment touches in accordance with the visual guidance provided until, e.g., at instance 902-n, the sequence of scans provides sufficient coverage of the fingerprint to complete the enrollment.

Figure 10:
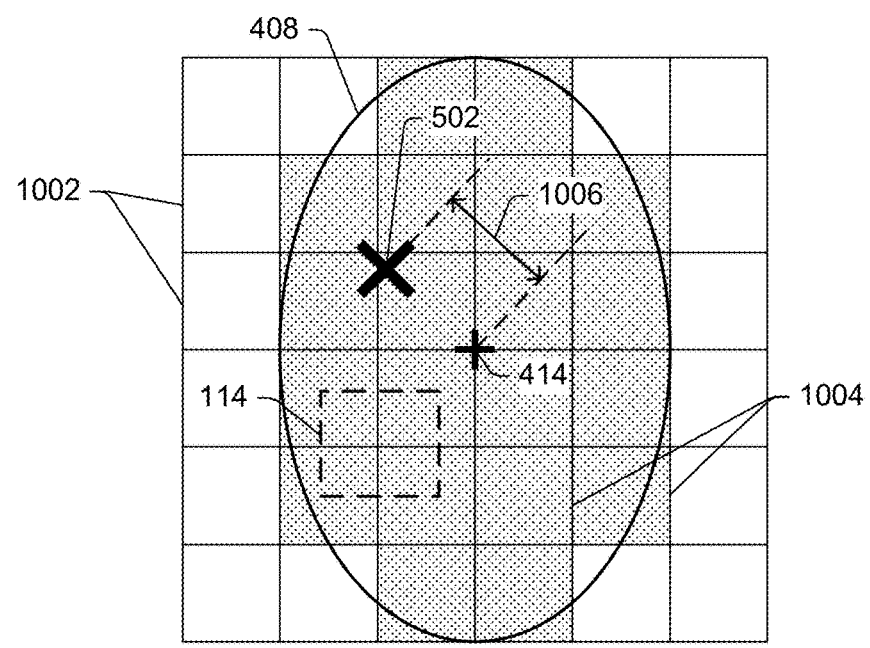
FIG. 10 illustrates an example implementation of an error calculation between a target location for an enrollment touch and a detected location of the touch input.

FIG. 10 illustrates an example implementation 1000 of an error calculation between a target location for an enrollment touch and a detected location of a touch input. The example implementation 1000 includes a portion of a touch display (e.g., touch-display device 106 from FIG. 1) proximate to the active area 114 of the local UDFPS 108. This portion of the touch display has touch pixels 1002 with no signal (e.g., no detected touch) and touch pixels 1004 with a signal (e.g., detected touch). The touch pixels 1004 are used to determine an ellipse (e.g., the ellipse 408) that approximates the size of the fingerprint. The center of the ellipse 408 is determined and represents a centroid (e.g., the centroid 414 from FIG. 4) of the fingerprint. Although the visual guide 502 may be provided, the user may not accurately position their finger to align the centroid of their fingerprint with the visual guide 502. Accordingly, some tolerance for error can be implemented.

The user's accuracy in following the visual guidance (e.g., visual guide 502) can be quantified and used to dynamically adjust the enrollment scheme (e.g., number and locations of the enrollment touches). For example, the position of the visual guide 502 and a location of the centroid 414 of the finger relative to the touch-display device 106 can be compared to determine a distance, d, (e.g., distance 1006). The distance 1006 can be compared to a threshold, th. The threshold, th, allows for some jitter of the user in placing their finger center on the visual guide 502. The threshold, th, represents an error threshold that provides an indication of whether the user is substantially following the instructions or has significantly deviated from the instructions. For example, if the distance, d, is less than the threshold, th, then it is assumed that the user is properly following the instructions. If, however, the distance, d, is greater than the threshold, th, then feedback (e.g., a visual or audio message) can be provided to instruct the user to place their finger center (e.g., the centroid 414) on the visual guide 502. The fingerprint centroid position and ellipse orientation can be used as an initial estimation to stitch fingerprint images to build the overall fingerprint template.

Figure 11:
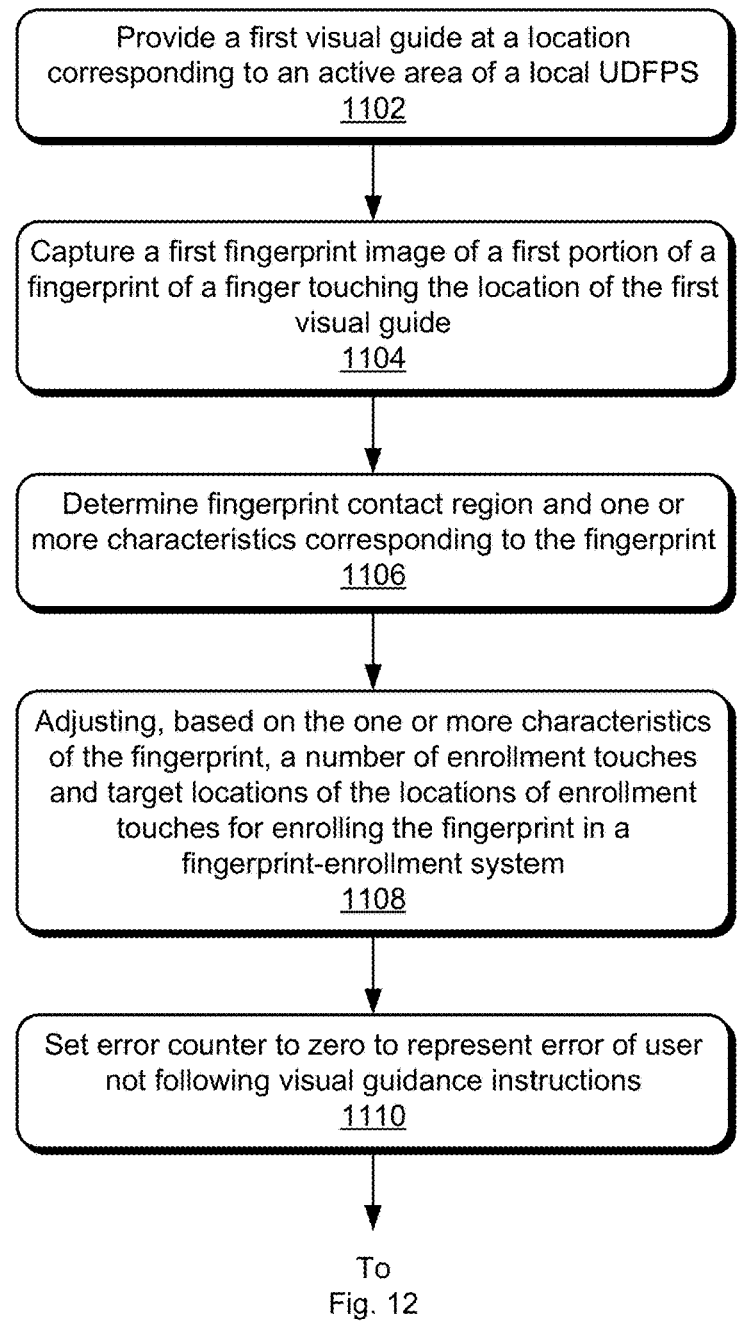
FIGS. 11 and 12 depict example methods for adaptive fingerprint-enrollment to finger characteristics using local under-display fingerprint sensors in an electronic device.
Figure 12:
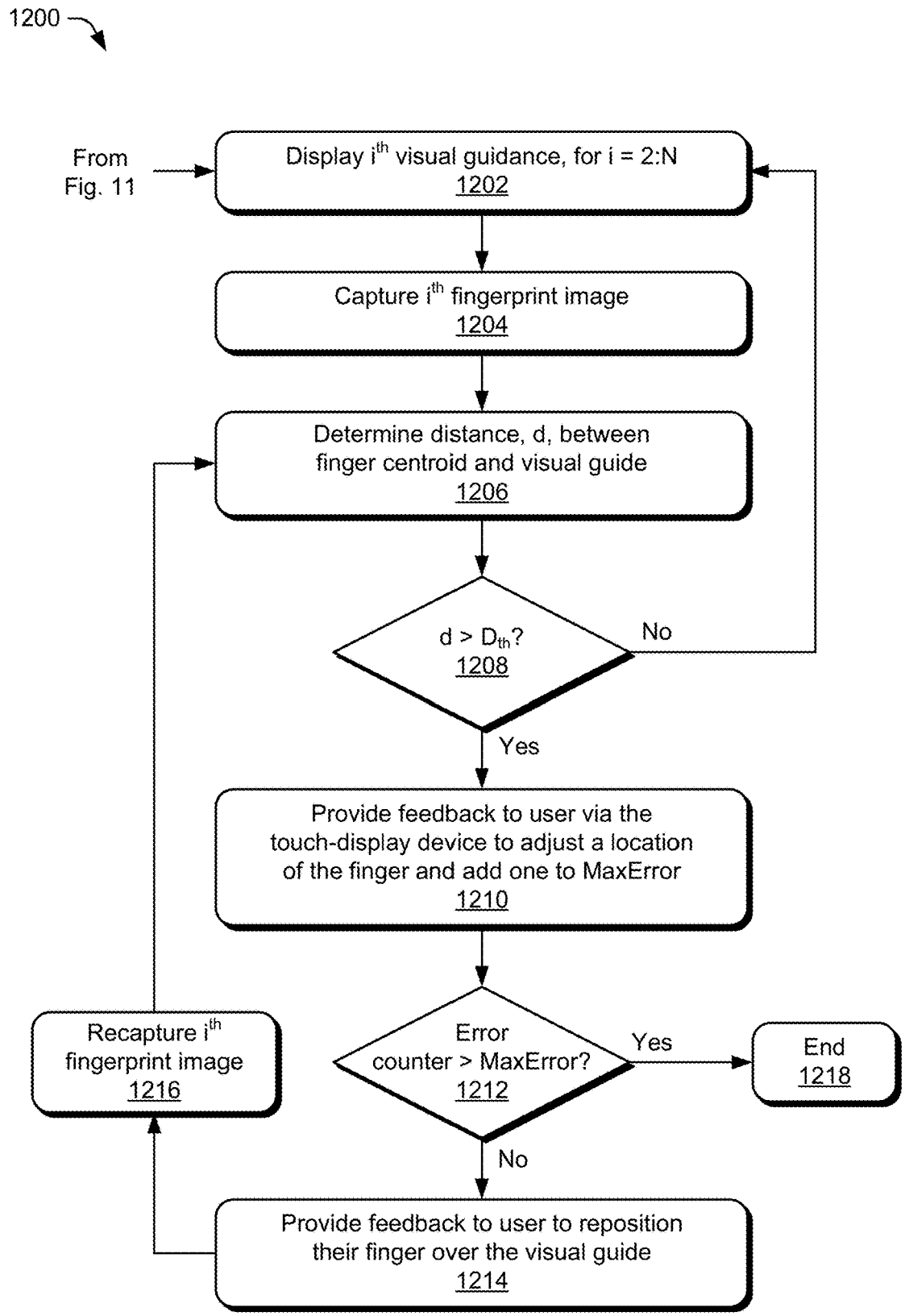

FIGS. 11 and 12 depict example methods 1100 and 1200, respectively, for adaptive fingerprint-enrollment to finger characteristics using local under-display fingerprint sensors in an electronic device. The methods 1100 and 1200 can be performed by the electronic device 102, which uses the adaptive-enrollment module 112 to adapt the number and location of enrollment touches to characteristics of a fingerprint. The method 1200 is supplemental to, and is optionally performed in conjunction with, the method 1100.

The methods 1100 and 1200 are shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example implementation 100 of FIG. 1 or to entities or processes as detailed in FIGS. 2-10, reference to which is made for example only. The techniques are not limited to performance by one entity or multiple entities operating on one device.

At 1102, a first visual guide is presented, via a touch-display device, at a location corresponding to an active area of a local UDFPS. The visual guide (e.g., the visual guide 502) is configured to indicate to a user where to place a finger on the touch-display device 106 to enable detection of a size of the fingerprint 122 of the finger and capture of a first fingerprint image of a first portion (e.g., the first portion 904) of the fingerprint 122.

At 1104, the UDFPS captures the first fingerprint image of a portion of the fingerprint of the finger touching the location of the visual guide. Assuming the user followed the instructions of the visual guide 502, the first fingerprint image may include a center portion of the fingerprint 122 that includes the centroid 414 of the fingerprint 122.

At 1106, a fingerprint contact region and one or more characteristics corresponding to the fingerprint are determined. For example, the touch-display device 106 may generate a heatmap (e.g., the heatmap 406) corresponding to an area of the touch-display device contacted by the finger. The heatmap can be used to approximate the fingerprint contact region (e.g., the ellipse 408), which is usable to estimate characteristics of the fingerprint, including one or more of size 304, shape 306, and orientation 308. Step 1106 is not necessarily limited to being performed subsequent to step 1104. In some implementations, for example, step 1106 may be performed prior to step 1104 or in parallel with step 1104.

At 1108, the adaptive-enrollment module adjusts, based on the one or more characteristics of the fingerprint, a number of enrollment touches and target locations of the enrollment touches for enrolling the fingerprint in a fingerprint-authentication system (e.g., the fingerprint-authentication system 110). In aspects, the target locations sequentially follow a pattern to complete enrollment with a minimum number of enrollment touches. The pattern with the minimum number of enrollment touches (e.g., $T_{min}$ from FIG. 3) is based on one or more characteristics of the fingerprint, including at least size. Step 1108 may include one or more of the steps from FIG. 8, including one or more of determining major and minor ellipse-dimensions of the fingerprint contact region (e.g., at 802), constructing one or more new ellipses that each have an offset from the fingerprint contact region (e.g., 804), determining major and minor dimensions of the new ellipses (e.g., at 806), determining a number of sectors of each ellipse (e.g., at 808), and determining a location of each visual guide on each ellipse region (e.g., 810). In some aspects, the pattern is a spiral pattern (clockwise spiral or counter-clockwise spiral). The pattern may begin at a location that enables capture of a center portion of the fingerprint by the local UDFPS 108. For example, the spiral pattern 602 or the spiral pattern 612 may include a first visual guide configured to align the centroid 414 of the fingerprint with the center of the active area 114 of the local UDFPS 108.

At 1110, an error counter is set to zero to represent an error of the user not following visual guidance instructions. The error counter is used to count the number of times the user fails to follow the visual guidance instructions. If the error counter reaches or exceeds a limit (e.g., MaxError), then the adaptive-enrollment module 112 may determine that the user is not interested in completing the enrollment.

Continuing at 1202 of FIG. 12, an $i^{th}$ visual guidance is displayed, where i=2:N. Where i=2, a second visual guide is displayed, which is offset from the center of the active area 114 of the local UDFPS 108. The second visual guide (e.g., visual guide 502) may be located within the active area 114 (e.g., proximate to an edge of the active area 114). Alternatively, the second visual guide may be located outside of the active area 114.

At 1204, a fingerprint image (e.g., $i^{th}$ image) is captured. For example, the local UDFPS 108 may scan a portion of the fingerprint that is located over the active area 114.

At 1206, a distance, d, between the fingerprint centroid and the location of the visual guide is determined. The fingerprint centroid (e.g., centroid 414) can be determined based on the fingerprint contact region detected by the touch-display device 106.

At 1208, the adaptive-enrollment module 112 determines if the distance, d, between the fingerprint centroid (e.g., centroid 414) and the visual guide 502 is greater than a threshold distance, $D_{th}$. Any suitable threshold distance, $D_{th}$, can be used, including a threshold distance substantially within a range of zero millimeters (mm) to 2.0 mm. The threshold distance, $D_{th}$, sets a tolerance limit (e.g., maximum distance) that the fingerprint centroid can be misaligned from the position of the visual guide 502 for an acceptable enrollment touch. If the distance, d, between the fingerprint centroid 414 and the visual guide 502 is less than the threshold distance, $D_{th}$, ("NO" at 1208), then the method 1200 returns to 1202 to display a next visual guide (e.g., i+1 visual guide).

If the distance, d, between the fingerprint centroid and the visual guide 502 is greater than the threshold distance, $D_{th}$, ("YES" at 1208), then at 1210, the adaptive-enrollment module 112 determines that the user is not following the instructions. In such a circumstance, feedback is provided to the user via the touch-display device 106 to adjust the location of their finger over the visual guide 502. Additionally, the error counter is incremented by one.

At 1212, the adaptive-enrollment module 112 determines if the error counter is greater than the MaxError. Any suitable integer can be used for the MaxError, including, e.g., 3, 4, 5, 6, 7, and so forth. If the error counter has not exceeded the MaxError ("NO" at 1212), then at 1214, feedback is provided to the user to reposition their finger over the visual guide 502. At 1216, the $i^{th}$ fingerprint image is recaptured and the method 1200 returns to 1206 to again check the distance, d, between the fingerprint centroid 414 and the location of the visual guide 502.

If, at 1212, the error counter exceeds the MaxError ("YES" at 1212), then at 1218, the adaptive fingerprint-enrollment can be ended. For example, the error counter exceeding the MaxError is an indication that the user is not following the guided-enrollment instructions. As such, it may be assumed that the user is not interested in the feedback or the adaptive fingerprint-enrollment. Consequently, the method 1200 can be ended. In some aspects, the adaptive fingerprint-enrollment process can transition to a conventional-enrollment scheme that allows the user to touch their finger at random locations on the touch-display device 106 and does not provide feedback to guide the user where to position their finger to reduce the number of enrollment touches. In another example, the adaptive fingerprint-enrollment process may restart. Alternatively, the adaptive fingerprint-enrollment process may end and an application running the adaptive fingerprint-enrollment process may close.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

A method for adaptive fingerprint-enrollment to finger characteristics using local under-display fingerprint sensors in an electronic device, the method comprising: providing a first visual guide via touch-display device and at a location corresponding to an active area of a local under-display fingerprint sensor, the active area being smaller than a typical size of a fingerprint of a user; capturing a first fingerprint image of a portion of the fingerprint of a finger of the user, the user's finger touching the touch-display device at the location of the first visual guide; determining a fingerprint contact region of the user's finger touching the touch-display device and, based on the fingerprint contact region, one or more characteristics corresponding to the fingerprint; adjusting, based on the one or more characteristics of the fingerprint, a number of enrollment touches and target locations of the enrollment touches for enrolling the fingerprint in a fingerprint-enrollment system; and providing visual guidance, based on the adjusted number and target locations of the enrollment touches, to indicate a sequence of locations on the touch-display device for the user to touch with the user's finger to complete enrollment of the fingerprint with the adjusted number of enrollment touches.

The one or more characteristics of the fingerprint may include one or more of size, shape, and orientation.

The one or more characteristics of the fingerprint may include an amount of pressure applied to the fingerprint contact region on the touch-display device.

The adjusting the number of enrollment touches and the target positions of the enrollment touches may include reducing the number of enrollment touches for a smaller fingerprint or increasing the number of enrollment touches for a larger fingerprint.

The adjusting the number of enrollment touches and the target positions of enrollment touches may include reducing a total number of the enrollment touches, reducing overlap between consecutive images of the enrollment touches, increasing a non-overlapping area for each new enrollment touch, and increasing coverage of an approximated area of the fingerprint.

The adjusting the number of enrollment touches and the target positions of enrollment touches may include adjusting the number of the enrollment touches to a number that results in consecutive fingerprint images having a threshold amount of overlap and achieves a total amount of coverage of the fingerprint that is within a threshold tolerance.

Each location in the sequence of locations for the enrollment touches may be determined based on an estimated centroid of the fingerprint.

The visual guidance may include a predefined pattern of touch points.

The visual guidance may include a pattern of touch points that is adapted to the user's finger, which is represented by the one or more characteristics of the touch input.

The sequence of locations may include a spiral pattern centered over the active area of the local under-display fingerprint sensor.

The method may further comprise: determining that an image quality of a captured image of an additional portion of the fingerprint captured by the local under-display fingerprint sensor is below a quality threshold; in response to determining that the image quality of the captured image is below the threshold, estimating finger pressure of the user's finger touching the touch-display device based on a heatmap of a fingerprint contact region; determining that the finger pressure is below a pressure threshold; and providing feedback to the user to press more firmly to increase a coupling between the user's finger and the touch-display device and increase the image quality of the image captured by the local under-display fingerprint sensor.

The method may further comprise: determining a major ellipse-dimension and a minor ellipse-dimension of a fingerprint ellipse that corresponds to a fingerprint contact region; constructing one or more new ellipses each having an offset from the fingerprint ellipse and being concentric with the fingerprint ellipse; determining a major dimension and a minor dimension of each new ellipse; and inferring, based on a size of the fingerprint ellipse, the target locations for the enrollment touches.

The inferring of the target locations for the enrollment touches may include: determining a number of sectors for a region of each ellipse that is non-overlapping with a smaller ellipse of the one or more new ellipses; correlating the target locations for the enrollment touches with the sectors in each ellipse; and ordering the target locations to form the sequence of locations.

A mobile electronic device comprising: a touch-display device; a local under-display fingerprint sensor located under the touch-display device; one or more processors; and memory storing: instructions that, when executed by the one or more processors, cause the one or more processors to implement an adaptive-enrollment module to: provide an adaptive-enrollment scheme adapted to one or more characteristics of a fingerprint of a user during enrollment of the fingerprint; and provide visual guidance and feedback to guide the user through a sequence of target locations for placing their finger to provide enrollment touches, the visual guidance output by the electronic device by performing the method disclosed above.

A computer-readable medium comprising instructions which, when executed by one or more processors, cause the one or more processors to carry out the method disclosed above.

CONCLUSION

Although aspects of the adaptive fingerprint-enrollment to finger characteristics using local under-display fingerprint sensors in an electronic device have been described in language specific to features and/or methods, the subject of the appended claims is not necessarily limited to the specific features or methods described. Rather, the specific features and methods are disclosed as example implementations of the claimed adaptive fingerprint-enrollment, and other equivalent features and methods are intended to be within the scope of the appended claims. Further, various different aspects are described, and it is to be appreciated that each described aspect can be implemented independently or in connection with one or more other described aspects.

What is claimed is:

1. A method for adaptive fingerprint-enrollment to finger characteristics using local under-display fingerprint sensors in an electronic device, the method comprising:
    providing a first visual guide via a touch-display device and at a location corresponding to an active area of a local under-display fingerprint sensor, the active area being smaller than a typical size of a fingerprint of a user;
    capturing a first fingerprint image of a portion of the fingerprint of a finger of the user, the user's finger touching the touch-display device at the location of the first visual guide;
    determining a fingerprint contact region of the user's finger touching the touch-display device and, based on the fingerprint contact region, one or more characteristics corresponding to the fingerprint;
    adjusting, based on the one or more characteristics of the fingerprint, a number of enrollment touches and target locations of the enrollment touches for enrolling the fingerprint in a fingerprint-enrollment system;
    providing visual guidance, based on the adjusted number and target locations of the enrollment touches, to indicate a sequence of locations on the touch-display device for the user to touch with the user's finger to complete enrollment of the fingerprint with the adjusted number of enrollment touches; and
    dynamically adjusting one or more locations of the sequence of locations based on an error calculation between one of the target locations and a detected location of a corresponding touch input on the touch-display device.

2. The method of claim 1, wherein the one or more characteristics of the fingerprint include one or more of size, shape, and orientation.

3. The method of claim 1, wherein the one or more characteristics of the fingerprint include an amount of pressure applied to the fingerprint contact region on the touch-display device.

4. The method of claim 1, wherein the adjusting the number of enrollment touches and the target positions of the enrollment touches includes reducing the number of enrollment touches for a smaller fingerprint or increasing the number of enrollment touches for a larger fingerprint.

5. The method of claim 1, wherein adjusting the number of enrollment touches and the target positions of enrollment touches includes reducing a total number of the enrollment touches, reducing overlap between consecutive images of the enrollment touches, increasing a non-overlapping area for each new enrollment touch, and increasing coverage of an approximated area of the fingerprint.

6. The method of claim 1, wherein adjusting the number of enrollment touches and the target positions of enrollment touches includes:
    adjusting the number of the enrollment touches to a number that results in consecutive fingerprint images having a threshold amount of overlap and achieves a total amount of coverage of the fingerprint that is within a threshold tolerance.

7. The method of claim 1, wherein the visual guidance includes a pattern of touch points that is adapted to the user's finger, which is represented by the one or more characteristics of the fingerprint.

8. The method of claim 1, wherein the sequence of locations forms a spiral pattern centered over the active area of the local under-display fingerprint sensor.

9. The method of claim 1, further comprising:
    determining that an image quality of a captured image of an additional portion of the fingerprint captured by the local under-display fingerprint sensor is below a quality threshold;
    in response to determining that the image quality of the captured image is below the threshold, estimating finger pressure of the user's finger touching the touch-display device based on a heatmap of a fingerprint contact region;
    determining that the finger pressure is below a pressure threshold; and
    providing feedback to the user to press more firmly to increase a coupling between the user's finger and the touch-display device and increase the image quality of the image captured by the local under-display fingerprint sensor.

10. The method of claim 1, further comprising:
    determining a major ellipse-dimension and a minor ellipse-dimension of a fingerprint ellipse that corresponds to a fingerprint contact region;
    constructing one or more new ellipses each having an offset from the fingerprint ellipse and being concentric with the fingerprint ellipse;
    determining a major dimension and a minor dimension of each new ellipse; and
    inferring, based on a size of the fingerprint ellipse, the target locations for the enrollment touches.

11. The method of claim 10, wherein the inferring of the target locations for the enrollment touches includes:
    determining a number of sectors for a region of each ellipse that is non-overlapping with a smaller ellipse of the one or more new ellipses;

correlating the target locations for the enrollment touches with the sectors in each ellipse; and ordering the target locations to form the sequence of locations.

12. The method of claim 1, wherein the error calculation is determined based on a distance between an estimated centroid of the touch input relative to the one of the target locations.

13. A method for adaptive fingerprint-enrollment to finger characteristics using local under-display fingerprint sensors in an electronic device, the method comprising:

providing a first visual guide via a touch-display device and at a location corresponding to an active area of a local under-display fingerprint sensor, the active area being smaller than a typical size of a fingerprint of a user;

capturing a first fingerprint image of a portion of the fingerprint of a finger of the user, the user's finger touching the touch-display device at the location of the first visual guide;

determining a fingerprint contact region of the user's finger touching the touch-display device and, based on the fingerprint contact region, one or more characteristics corresponding to the fingerprint;

adjusting, based on the one or more characteristics of the fingerprint, a number of enrollment touches and target locations of the enrollment touches for enrolling the fingerprint in a fingerprint-enrollment system; and providing visual guidance, based on the adjusted number and target locations of the enrollment touches, to indicate a sequence of locations on the touch-display device for the user to touch with the user's finger to complete enrollment of the fingerprint with the adjusted number of enrollment touches, wherein each location in the sequence of locations for the enrollment touches is determined based on an estimated centroid of the fingerprint.

14. A mobile electronic device comprising:

a touch-display device;

a local under-display fingerprint sensor located under the touch-display device and having an active area that is smaller than a typical size of a fingerprint of a user, the local under-display fingerprint sensor configured to capture, at a location corresponding to the active area, a fingerprint image of a portion of the fingerprint of a finger of the user when the user's finger is touching the touch-display device at the location of the active area;

one or more processors; and memory storing instructions that, when executed by the one or more processors, cause the one or more processors to implement an adaptive-enrollment module to:

determine one or more characteristics of the fingerprint based on the fingerprint image;

provide an adaptive-enrollment scheme adapted to the one or more characteristics of the fingerprint of the user during enrollment of the fingerprint, the adaptive enrollment scheme adapted based on adjusting a number of enrollment touches and target locations of the enrollment touches, based on the one or more characteristics of the fingerprint, for enrolling the fingerprint in a fingerprint-enrollment system; and provide visual guidance and feedback to guide the user through a sequence of target locations for placing their finger to provide enrollment touches, the visual guidance including a first visual guide provided via the touch-display device at the location corresponding to the active area of the of the local under-display fingerprint sensor, the visual guidance provided based on the adjusted number of the enrollment touches and the adjusted target locations of the enrollment touches to indicate a sequence of locations on the touch-display device for the user to touch with the user's finger to complete enrollment of the fingerprint, one or more locations of the sequence of locations being dynamically adjustable based on an error calculation between one of the target locations and a detected location of a corresponding touch input on the touch-display device.

15. The mobile electronic device of claim 14, wherein the one or more characteristics of the fingerprint include at least one of size, shape, orientation, or an amount of pressure applied to a fingerprint contact region on the touch-display device, the fingerprint contact region corresponding to a region on the touch-display device touched by the user's finger.

16. The mobile electronic device of claim 14, wherein the adjusting the number of enrollment touches and the target positions of the enrollment touches includes reducing the number of enrollment touches for a smaller fingerprint or increasing the number of enrollment touches for a larger fingerprint.

17. The mobile electronic device of claim 14, wherein adjusting the number of enrollment touches and the target positions of enrollment touches includes reducing a total number of the enrollment touches, reducing overlap between consecutive images of the enrollment touches, increasing a non-overlapping area for each new enrollment touch, and increasing coverage of an approximated area of the fingerprint.

18. A computer-readable medium comprising instructions which, when executed by one or more processors, cause the one or more processors to:

provide a first visual guide via a touch-display device and at a location corresponding to an active area of a local under-display fingerprint sensor, the active area being smaller than a typical size of a fingerprint of a user;

capture a first fingerprint image of a portion of the fingerprint of a finger of the user, the user's finger touching the touch-display device at the location of the first visual guide;

determine a fingerprint contact region of the user's finger touching the touch-display device and, based on the fingerprint contact region, one or more characteristics corresponding to the fingerprint;

adjust, based on the one or more characteristics of the fingerprint, a number of enrollment touches and target locations of the enrollment touches for enrolling the fingerprint in a fingerprint-enrollment system;

provide visual guidance, based on the adjusted number and target locations of the enrollment touches, to indicate a sequence of locations on the touch-display device for the user to touch with the user's finger to complete enrollment of the fingerprint with the adjusted number of enrollment touches; and dynamically adjust one or more locations of the sequence of locations based on an error calculation between one of the target locations and a detected location of a corresponding touch input on the touch-display device.

19. The computer-readable medium of claim 18, wherein the instructions cause the one or more processors further to:

determine that an image quality of a captured image of an additional portion of the fingerprint captured by the local under-display fingerprint sensor is below a quality threshold;

in response to determining that the image quality of the captured image is below the threshold, estimate finger pressure of the user's finger touching the touch-display device based on a heatmap of the fingerprint contact region;

determine that the finger pressure is below a pressure threshold; and provide feedback to the user to press more firmly to increase a coupling between the user's finger and the touch-display device and increase the image quality of the image captured by the local under-display fingerprint sensor.

20. The computer-readable medium of claim 18, wherein the instructions cause the one or more processors further to:

determining a major ellipse-dimension and a minor ellipse-dimension of a fingerprint ellipse that corresponds to the fingerprint contact region;

constructing one or more new ellipses each having an offset from the fingerprint ellipse and being concentric with the fingerprint ellipse;

determining a major dimension and a minor dimension of each new ellipse; and inferring, based on a size of the fingerprint ellipse, the target locations for the enrollment touches.

* * * * *